3,763,209
2,4-DICYANO-6-NITRO-BENZENE AMINES

Klaus Wagner, Cologne-Buchheim, Ernst Roos, Cologne-Flittard, Ludwig Eue, Cologne-Stammheim, and Helmuth Hack, Cologne-Buchheim, Germany, assignors to Bayer Aktiengesellschaft, Leverkusen, Germany
No Drawing. Filed Nov. 24, 1969, Ser. No. 879,525
Claims priority, application Germany, Nov. 29, 1968,
P 18 11 717.4
Int. Cl. C07c *121/78*
U.S. Cl. 260—465 E          9 Claims

---

ABSTRACT OF THE DISCLOSURE 2,4-dicyano-6-nitro-benzene amines and ethers; i.e., 2,4-dicyano-6-nitro-N-(optionally alkyl, hydroxyalkyl, alkoxyalkyl, alkenyl, cycloalkyl, phenyl-alkyl and phenyl substituted)-N-(optionally alkyl and alkenyl substituted)-anilines, 2,4 - dicyano-6-nitro-phenyl-substituted-morpholine, -pyrrolidine and -piperidine, and 2,4-dicyano-6-nitro-phenyl-alkyl ethers, which possess herbicidal properties, and which may be produced by conventional methods.

---

The present invention relates to and has for its objects the provision for particular new 2,4-dicyano-6-nitrobenzene amines and ethers; i.e., 2,4-dicyano-6-nitro-N-(optionally alkyl, hydroxyalkyl, alkoxy-alkyl, alkenyl, cycloalkyl, phenyl-alkyl and phenyl substituted)-N-(optionally alkyl and alkenyl substituted)-anilines, 2,4-dicyano-6-nitro-phenyl-substituted morpholine, pyrrolidine and -piperidine, and 2,4-dicyano-6-nitro-phenyl-alkyl ethers which possess valuable, especially selective, herbicidal properties, active compositions in the form of mixtures of such compounds with solid and liquid dispersible carrier vehicles, and methods for producing such compounds and for using such compounds in a new way, especially for combating weeds, undesired plants, and the like, with other and further objects becoming apparent from a study of the within specification and accompanying examples.

It is known that substituted monocyano-dinitrobenzenes, such as 2-cyano-4,6-dinitro-N-methoxy-aniline (A), can be used as herbicides (see Germany published Pat. 1,203, 536).

Furthermore, the herbicidal use of monocyano-dinitroanilines, such as 4-cyano-2,6-dinitro-N,N-di-n-propyl-aniline (B), is known (see U.S. Pat. 3,257,190).

It has now been found, in accordance with the present invention, that the particular new 2,4-dicyano-6-nitrobenzene amine and ether compounds of the formula

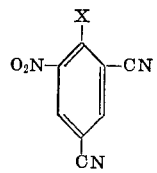

(I)

in which X is the radical

(i)

or the radical

—O—R″          (ii)

in which correspondingly

R is hydrogen, alkyl of 1–6 carbon atoms, hydroxyalkyl of 1–4 carbon atoms, alkoxyalkyl having 1–4 carbon atoms in the alkoxy moiety and 1–4 carbon atoms in the alkyl moiety, alkenyl of 2–6 carbon atoms, cycloalkyl of 5–8 carbon atoms, phenyl-alkyl having 1–2 carbon atoms in the alkyl moiety, and phenyl, R′ is hydrogen, alkyl of 1–6 carbon atoms, and alkenyl of 2–6 carbon atoms, with the proviso that R and R′ when taken together with the adjacent nitrogen atom form a heterocyclic group of 5–7 ring atoms, and R″ is alkyl of 1–4 carbon atoms, exhibit strong, and especially selective, herbicidal properties.

It has been furthermore found, in accordance with the present invention, that the particular new compounds of Formula I above may be produced by the process which comprises (a) Reacting 1-chloro-2,4-dicyano-6-nitro-benzene of the formula

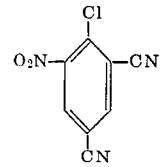

(II)

with an amine compound of the formula

(III)

in which

R and R′ are the same as defined above, or with an alkoxide of the formula

R″—O—M          (IV)

in which

R″ is the same as defined above, and

M is an alkali metal atom such as sodium, potassium, and the like.

or (b) Reacting 1-alkoxy-2,4-dicyano-6-nitro-benzene of the formula

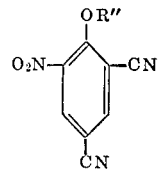

(Ii)

in which

R″ is the same as defined above, with an amine compound of Formula III above, or (c) Reacting 1-chloro-2,4-dicyano-benzene of the formula

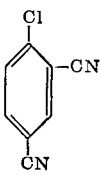

(V)

with an amine compound of Formula III above, and nitrating the resulting 2,4-dicyano-aniline product of the formula

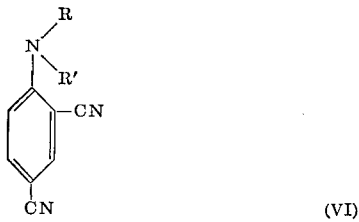

(VI)

in which

R and R' are the same as defined above, or (d) Nitrating 1-alkoxy-2,4-dicyano-benzene of the formula

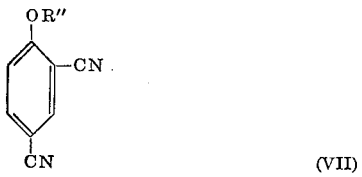

(VII)

in which R'' is the same as defined above.

It is surprising that the 2,4-dicyano-6-nitro-benzene amine and ether compounds of Formula I above possess stronger herbicidal properties than the previously known compounds of analogous structure and the same type of activity such as the aforesaid monocyano-dinitro-phenyl derivatives, and especially compounds (A) and (B) above, and, at the same time, are also selective in their effect. The active compounds according to the present invention therefore represent a valuable contribution to the art.

Advantageously, in accordance with the present invention, in the various formulae herein:

X represents the radical

(i)

or the radical

—O—R''  (ii)

in which correspondingly:

R represents hydrogen; straight and branched chain lower alkyl hydrocarbon of 1–6 carbon atoms such as methyl, ethyl, n- and iso-propyl, n-, iso-, sec.- and tert.-butyl, n- and iso-amyl, n- and iso-hexyl, and the like, especially $C_{1-5}$ or $C_{1-4}$ or $C_{1-3}$ or $C_{1-2}$ alkyl, and more especially $C_{1-4}$ alkyl; straight and branched hydroxy-lower alkyl of 1–4 carbon atoms such as hydroxy-substituted methyl to tert.-butyl inclusive as defined above, and the like, especially hydroxy-$C_{1-3}$ or $C_{1-2}$ alkyl, and more especially β-hydroxy-ethyl; straight and branched lower alkoxy-lower alkyl having 1–4 carbon atoms in the alkoxy radical and 1–4 carbon atoms in the alkyl radical such as methoxy, ethoxy, n- and iso-propoxy, n-, iso-, sec.- and tert.-butoxy substituted-methyl to tert.-butyl inclusive as defined above, and the like, especially $C_{1-3}$ or $C_{1-2}$ alkoxy-$C_{1-3}$ or $C_{1-2}$ alkyl, and more especially β-methoxy-ethyl; straight and branched chain lower alkenyl of 2–6 carbon atoms such as vinyl, α-, β- and γ-allyl (i.e. prop-1-enyl, 1-methyl-vinyl and prop-2-enyl), but-1,2 and 3-enyl, 1-methyl-prop-1 and 2-enyl, 2-methyl-prop-1 and 2-enyl, 1-ethyl-vinyl, pent-1,2,3 and 4-enyl, hex-1,2,3,4 and 5-enyl, and the like, especially $C_{2-5}$ or $C_{2-4}$ or $C_{2-3}$ alkenyl, more especially $C_{2-4}$ alkenyl, and most especially allyl, i.e. prop-2-enyl, cycloalkyl having 5–8 or 5–7 or 5–6 ring atoms such as cyclopentyl and cyclohexyl, especially cyclohexyl; phenyl-alkyl having 1–2 carbon atoms in the alkyl moiety such as benzyl, phenyl-eth-1 and 2-yl, and the like, especially benzyl; and phenyl;

R' represents hydrogen; straight and branched chain lower alkyl hydrocarbon of 1–6 carbon atoms such as methyl to iso-hexyl inclusive as defined above, and the like, especially $C_{1-5}$ or $C_{1-4}$ or $C_{1-3}$ or $C_{1-2}$ alkyl, and more especially $C_{1-4}$ alkyl; and straight and branched chain lower alkenyl of 2–6 carbon atoms such as vinyl to hex-1,2,3,4 and 5-enyl inclusive as defined above, and the like, especially $S_{2-5}$ or $C_{2-4}$ or $C_{2-3}$ alkenyl, more especially $C_{2-4}$ alkenyl, and most especially allyl, i.e. prop-2-enyl; with the proviso that R and R' when taken together with the adjacent nitrogen atom form a heterocyclic group having 5–7 or 5–6 ring atoms such as pyrrolidino, morpholino and piperidino, especially morpholino; and R'' represents straight and branched chain lower alkyl hydrocarbon of 1–4 carbon atoms such as methyl to tert.-butyl inclusive as defined above, and the like, especially $C_{1-3}$ or $C_{1-2}$ alkyl.

Preferably, R is hydrogen; or $C_{1-5}$ alkyl; or hydroxy-$C_{1-3}$ alkyl; or $C_{1-3}$ alkoxy-$C_{1-3}$ alkyl; or $C_{2-4}$ alkenyl; or benzyl; or phenyl; R' is hydrogen; or $C_{1-4}$ alkyl; or $C_{2-4}$ alkenyl; with the proviso that R and R' when taken together with the adjacent nitrogen atom form a morpholino group; and R'' is $C_{1-3}$ alkyl.

In particular, R and R' each individually is hydrogen; or $C_{1-4}$ alkyl; and R'' is $C_{1-3}$ alkyl; such that when X is

then R and R' each individually is hydrogen or $C_{1-4}$ alkyl, and when X is —OR'' then R'' is $C_{1-3}$ alkyl.

If 1-chloro-2,4-dicyano-6-nitro-benzene of the Formula II above is used as the starting material, the reaction course according to process variant (a) can be illustrated by the following formula scheme:

(a)

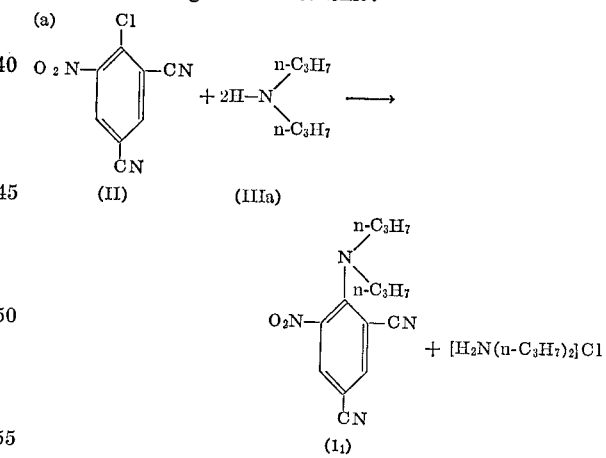

If 2,4-dicyano-6-nitro-anisole is used according to process variant (b) as starting material, the reaction may be illustrated as follows:

(b)

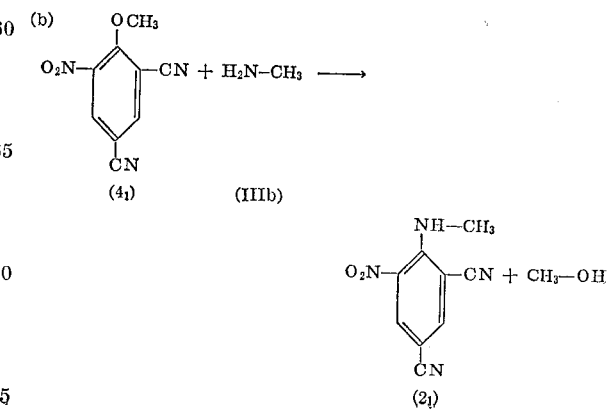

If a start is made from 1-chloro-2,4-dicyano-benzene, the reaction course of process variant (c) may be illustrated by the following formula scheme:

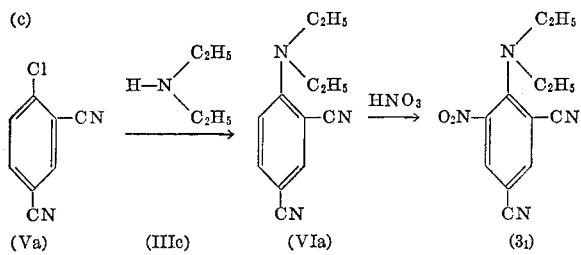

Finally, if 2,4-dicyano-anisole is used according to process variant (d) as starting material, the reaction course may be illustrated as follows:

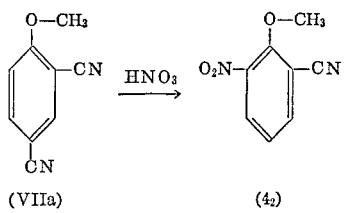

The starting materials which may be used for reaction variants (a) to (d) are clearly characterized by Formulae II to VII above as well as by Formula Iii.

The compound of Formula V which may be used as starting material is known. The compound of Formula II which may be used as starting material is new and can be prepared by reacting 2,4-dicyano-6-nitro-anisole ($4_2$) with pyridine and phosphorous oxychloride (cf. Example 5(a) below).

As examples of compounds of Formula Iii which may be used as starting material, there may be mentioned: 1-methoxy - 2,4 - dicyano-6-nitro-benzene, 1-ethoxy-2,4-di-cyano-6-nitrobenzene, and the like. These compounds are new and are embraced by the present invention [cf. reaction variants (a) and (b) above and Examples 2(a) and (b) below].

Compounds of Formula VI are known intermediates [cf. reaction variant (c) above].

As examples of compounds of Formula VII which may be used as starting materials, and which may be prepared by a simple method (cf. Example 3(a) below), there may be mentioned: 1-methoxy-2,4-dicyano-benzene, 1-ethoxy-2,4-dicyano-benzene, and the like.

The compounds of Formula III above which may be used as starting materials are known. As examples of such compounds of Formula III, there may be mentioned: ammonia, methylamine, ethylamine, n-propylamine, 2-hydroxy-ethylamine, 2-methoxy-ethylamine, iso-butylamine, tert.-butylamine, allylamine, benzylamine, dimethylamine, diethylamine, di-n-propylamine, di-n-butylamine, diallylamine, aniline, morpohline, and the like.

The alkoxides of Formula IV above which may be used as starting materials are also known. As examples of such compounds of Formula IV, there may be mentioned: sodium methylate, potassium methylate, sodium ethylate, and the like.

As solvents for reaction variant (a), predominantly suitable are inert organic solvents: these include hydrocarbons, such as benzene or toluene; ethers, such as diethyl ether, tetrahydrofuran or dioxan; esters, such as ethyl acetate; nitriles, such as acetonitrile; and the like. For reaction variant (b), preferably suitable are alcohols, such as methanol or ethanol; ketones, such as acetone or methylethyl ketone; and the like. The same holds true for the first reaction step of reaction variant (c). For the nitration reaction (i.e., the second reaction step of variant (c), as well as reaction variant (d)), the solvents customary for nitration reactions can be used such as sulfuric acid, glacial acetic acid, and the like.

The reaction temperatures can be varied within a fairly wide range. In general, the work in the case of reaction variant (a) and in the first step of reaction variant (c) is carried out at substantially between about 40–120° C., and preferably between about 60–100° C.; in the case of reaction variant (b), the reaction is carried out at substantially between about 20–100° C., and preferably between about 40–80° C.; in the case of the second step of reaction variant (c), and in the case of reaction variant (d), the reactino is carried out at substantially between about −20 to +60° C., and preferably between about −10 to +40° C.

When carrying out the production processes according to the present invention, the reagents are preferably used in stoichiometric proportions. The working up of the reaction mixtures is carried out in customary manner, as the artisan will appreciate.

Advantageously, the active compounds according to the present invention exhibit a strong herbicidal potency. Such compounds can therefore be used for the control of weeds and are intended to be used preferably for the selective control of weeds. Particularly noteworthy is the strong effect against varieties of millet, for example of the genera Panicum, Echinochloa, Digitaria and Setaria. By weeds are meant in the widest sense all plants which grow in places where they are not desired. Whether the active componds according to the present invention act as total or selective herbicides depends essentially on the amount applied, as the artisan will appreciate.

The active compounds according to the present invention can be used for example in the case of the following plants: dicotyledons, such as mustard (Sinapis), cress (Lepidium), cleaver (Galium), common chickweed (Stellaria), mayweed (Matricaria), smallflower Galinsoga (Galinsoga), fathen (Chenopodium), stinging nettle (Urtica), groundsel (Senecio), cotton (Gossypium), beets (Beta), carrots (Daucus), beans (Phaseolus), potatoes (Solanum), coffee (Coffea); monocatyledons, such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum); wheat (Triticum), millet (Panicum), sugar cane (Saccharum); and the like.

Particularly advantageous is the use of the instant compounds for the control of weeds in cereals, maize and cotton.

Significantly, the active compounds according to the present invention also exhibit insecticidal and fungicidal properties.

The active compounds according to the instant invention can be utilized, if desired, in the form of the usual formulations or compositions with conventional inert (i.e., plant compatible or herbicidally inert) pesticide diluents or extenders, i.e., diluents or extenders of the type usable in conventional pesticide formulations or compositions, e.g., conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g., benzene, toluene, xylene, etc.), halogenated, especially chlorinated, aromatic hydrocarbons (e.g., chlorobenzenes), paraffins (e.g., petroleum fractions), chlorinated aliphatic hydrocarbons (e.g., methylene chloride, etc.), alcohols (e.g., methanol, ethanol, propanol, butanol, etc.), ethers, ether-alcohols (e.g., glycol monomethyl ether, etc.), amines (e.g., ethanolamine, etc.), amides (e.g., dimethyl formamide, etc.), sulfoxides (e.g., dimethyl sulfoxide, etc.), ketones (e.g., acetone, etc.), and/or water; as well as inert dispersible finely divided solid carriers, such as ground natural minerals (e.g., kaolins, alumina, silica, chalk, i.e., calcium carbonate, talc, kieselguhr, etc.), and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose; emulsifying agents, such as nonionic and/or anionic emulsifying agents (e.g., polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other herbicides, or fungicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.005–10%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.005–95%, and preferably 0.01–95%, by weight of the mixture.

In particular, the amount of active compound per unit area varies according to the purpose intended and the mode of application. In general, substantially between about 1–80 kg. of active compound per hectare are applied, preferably between about 2–40 kg. of active compound per hectare, irrespective of the presence or absence of the carrier vehicle.

When the instant compounds are used as total herbicides, the amounts of active compound applied generally are substantially between about 40–80 kg./hectare. When the instant compounds are used for selective weed control, the amounts of active compound applied generally are substantially between about 1–20 kg./hectare, and preferably between about 2–10 kg./hectare.

The active compounds can also be used in accordance with the well known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound or even the 100% active substance alone, e.g., about 20–100% by weight of the active compound.

While the active compounds can be used according to the post-emergence method, they are particularly effective when used according to the pre-emergence method, i.e., both before and after the emergence of the cultivated plants and weeds, yet preferably before emergence.

Furthermore, the present invention contemplates methods of selectively killing, combating or controlling undesired plants, e.g., weeds and the like, which comprise applying to at least one of (a) such weeds and (b) their habitat, i.e., the locus to be protected, a herbicidally effective or toxic amount of the particular active compound of the invention alone or together with a carrier vehicle as noted above. The instant formulations or compositions are applied in the usual manner, for example by spraying, atomizing, squirting, scattering, dusting, watering, sprinkling, and the like, whether for pre-emergence application to the soil or post-emergence application to the weeds.

It will be realized, of course, that in connection with the pre-emergence use of the instant compounds as well as the post-emergence use thereof, the concentration of the particular active compound utilized, alone or in admixture with the carrier vehicle, will depend upon the intended application, as the artisan will appreciate, and may be varied within a fairly wide range depending upon the weather conditions, the purpose for which the active compound is used, e.g., as total or only selective herbicidal effect, and the plants which are to be controlled or protected. Therefore, in special cases, it is possible to go above or below the aforementioned concentration ranges and amounts per unit area.

The following examples illustrate, without limitation, the herbicidal activity of the particular active compounds of the present invention.

EXAMPLE 1

Pre-emergence test

Solvent: 5 parts by weight acetone
Emulsifier: 1 part by weight alkylaryl polyglycol ether.

To produce a suitable preparation of the particular active compound, 1 part by weight of such active compound is mixed with the stated amount of solvent, the stated amount of emulsifier is then added, and the resulting concentrate is thereafter diluted with water to the desired final concentration.

Seeds of the test plants are sown in normal soil and, after 24 hours, watered with the preparation of the given active compound. It is expedient to keep constant the amount of water per unit area. The concentration of such active compound in the preparation is of no importance, only the amount of active compound applied per unit area being decisive. After three weeks, the degree of damage to the test plants is determined and characterized by the values 0–5, which have the following meaning.

0: No effect.
1: Slight damage or delay in growth.
2: Marked damage or inhibition of growth.
3: Heavy damage and only deficient development or only 50% emerged.
4: Plants partially destroyed after germination or only 25% emerged.
5: Plants completely dead or not emerged.

The particular active compounds tested, the amounts applied and the results obtained can be seen from the following Table 1.

TABLE 1.—PRE-EMERGENCE TEST

| Compound | | Active compound applied in kg./hectare | Echinochloa | Chenopodium | Galinsoga | Stellaria | Matricaria | Lolium | Maize | Cotton | Oats |
|---|---|---|---|---|---|---|---|---|---|---|---|
| (A) | $NO_2$—⟨⟩—O—$CH_3$ with $NO_2$ and CN substituents (known) | 10 | 3 | 1 | 1 | 1 | 2 | 1 | 0 | 1 | 1 |
|  |  | 5 | 1 | 1 | 1 | 1 | 2 | 1 | 0 | 1 | 1 |
| (B) | CN—⟨⟩—N—$(C_3H_7\text{-}n)_2$ with $NO_2$ substituents (known) | 10 | 2 | 0 | 0 | 0 | 0 | 0 | 0 | 0 | 0 |
|  |  | 5 | 0 | 0 | 0 | 0 | 0 | 0 | 0 | 0 | 0 |
| ($4_2$) | NC—⟨⟩—O—$CH_3$ with $NO_2$ and CN substituents | 10 | 5 | 5 | 3 | 3 | 3 | 3 | 0 | 2 | 2 |
|  |  | 5 | 5 | 4 | 0 | 1 | 3 | 1 | 0 | 1 | 1 |
| ($1_2$) | $O_2N$—⟨⟩—$N(C_3H_7\text{-}n)_2$ with CN substituents | 10 | 5 | 5 | 3 | 4 | 3 | 3 | 1 | 0 | 3 |
|  |  | 5 | 4 | 4 | 0 | 2 | 2 | 1 | 0 | 0 | 2 |
| ($2_2$) | $O_2N$—⟨⟩—NH—$CH_3$ with CN substituents | 10 | 5 | 3 | 5 | 3 | 4–5 | 5 | 0 | 1 | 1 |
|  |  | 5 | 5 | 2 | 4–5 | 1 | 3 | 4–5 | 0 | 0 | 0 |
| ($5_1$) | $O_2N$—⟨⟩—$NH_2$ with CN substituents | 10 | 5 | 5 | 5 | 5 | 5 | 5 | 1 | 1 | 2 |
|  |  | 5 | 5 | 4 | 5 | 4 | 5 | 5 | 0 | 0 | 1 |

EXAMPLE 2

[Reaction variant (b)]

($5_2$)

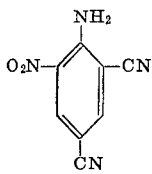

A rapid stream of ammonia is introduced for 1 hour into a solution (having a temperature of 60° C.) of 81.2 g. (0.4 mol) 2,4-dicyano-6-nitro-anisole in 500 cc. methanol, and the reaction mixture is maintained at 60° C. for a further 2 hours. After cooling, the precipitated orange product is filtered off with suction. The residue on the filter is washed with water, and then with methanol, and then dried. 65 g. (86% of the theory) of 2,4-dicyano-6-nitro-aniline of melting point 228° C. are obtained.

The starting 2,4-dicyano-6-nitro-anisole ($4_1$) used as starting material is obtained by the following two-step procedure:

(a)

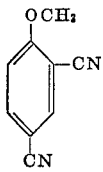

(VIIa)

To a solution of 80 g. (2 mol) sodium hydroxide in 4000 cc. methanol are added at 60° C. portionwise 325 g. (2 mols) 2,4-dicyano-chlorobenzene and the reaction mixture is refluxed for 8 hours. After cooling, the precipitated product is filtered off with suction. The residue on the filter is washed with water and then dried. 270 g. (85% of the theory) of 2,4-dicyano-anisol of melting point 208–209° C. are obtained.

(b)

($4_1$) or ($4_2$)

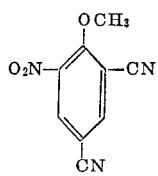

To 600 cc. nitric acid (of the density 1.52) at +5° C. are added portionwise with vigorous stirring 120 g. of 2,4-dicyano-anisol, the temperature being kept at or below +10° C. The reaction mixture is stirred at 5–10° C. for a further 3 hours, then poured into ice-water. The precipitated product is filtered off with suction, washed with water, and then dried. 142 g. (91% of the theory) of 2,4-dicyano-6-nitro-anisol are obtained, melting at 123–124° C. after recrystallization from methanol.

EXAMPLE 3

2,4-dicyano-6-nitro-phenetol is obtained by the following two-step procedure:

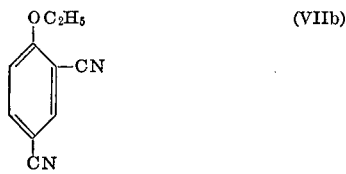 (VIIb)

To a solution of sodium ethoxide, prepared from 34.5 g. (1.5 mols) sodium and 2000 cc. ethanol, are added portionwise at 70° C. 244 g. (1.5 mols) of 2,4-dicyano-chlorobenzene. The reaction mixture is then refluxed for 4 hours. After cooling, the precipitated crystalline product is filtered off with suction, washed with water, and then dried. 176 g. (68% of the theory) of 2,4-dicyano-phenetol of melting point 157–158° C. are obtained.

(b)

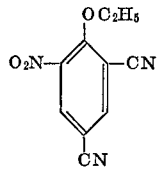

(6₁)

To 600 cc. nitric acid (of the density 1.52) at +5° C. are added portionwise with vigorous stirring 120 g. of 2,4-dicyano-phenetol, the temperature being kept at or below +10° C. The reaction mixture is maintained at 5–10° C. for a further 3 hours, and then poured into ice-water. The precipitated product is filtered off with suction, washed with water, and then dried. 142 g. (94% of the theory) 2,4-dicyano-6-nitro-phenetol of melting point 104–105° C. are obtained.

EXAMPLE 4

[Reaction variant (b)]

(2₃)

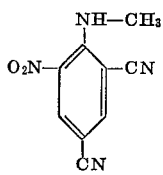

203 g. (1 mol) 2,4-dicyano-6-nitro-anisole are dissolved in 2000 cc. methanol. To this solution there are added slowly at 50–60° C., with stirring, 150 g. of a 40% aqueous solution of methyl-amine, and the reaction mixture is stirred at 60° C. for a further 2 hours. After cooling, the yellow product is filtered off with suction. The residue on the filter is washed with water, and then with methanol, and then dried. 186 g. (92% of the theory) of 2,4-dicyano-6-nitro-N-methyl-aniline of melting point 168° C. are obtained.

The starting 2,4-dicyano-6-nitro-anisole used as starting material is obtained in accordance with the procedure of Examples 2(a) and (b) above (cf. compound 4₁).

EXAMPLE 5

[Reaction variant (a)]

(1₃)

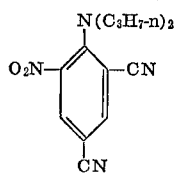

20.7 g. (0.1 mol) 2,4-dicyano-6-nitro-1-chloro-benzene are dissolved in 400 cc. benzene. 20.4 g. (0.2 mol) di-n-propylamine are added dropwise, with stirring, to this solution, and the reaction mixture is further stirred at 80° C. for 1 hour. After cooling, the precipitated di-n-propylamine hydrochloride is filtered off with suction and the benzene filtrate is evaporated to dryness in a vacuum. The solid residue yields, after recrystallization from cyclohexane, 22 g. (81% of the theory) of 2,4-dicyano-6-nitro-N,N-di-n-propyl-aniline in the form of small, golden-yellow needles of melting point 105–107° C.

The starting 2,4-dicyano-6-nitro-1-chloro-benzene (II) is obtained by the following procedure:

(a)

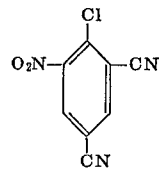 (II)

A solution of 121.6 g. (0.6 mol) of 2,4-dicyano-6-nitro-anisol (cf. compound (4₁) of Examples 2(a) and (b) above) and 48 g. (0.6 mol) of piperidine in 750 cc. toluene is refluxed for 20 minutes. After cooling to +90° C., 33 cc. (0.36 mol) of phosphorus oxychloride is added dropwise with stirring. Then the reaction mixture is refluxed again (at +110° C.) for 4 hours. After cooling, the organic layer is separated from the oily residue. The toluene is distilled off in vacuo, and the yellow crystalline residue is recrystallized from methanol. 72 g. (58% of the theory) of 2,4-dicyano-6-nitro-1-chloro-benzene of melting point 120–121° C. are obtained.

In corresponding manner, the following compounds of Formula I above, in which X is as identified in Table 2, are prepared:

TABLE 2

| | X | M.P., °C. |
|---|---|---|
| (7₁) | NH—C₂H₅ | 130–132 |
| (8₁) | NH—CH₂—CH₂—CH₃ | 87–88 |
| (9₁) | NH—CH₂—CH₂—OH | 129–131 |
| (10₁) | NH—CH₂CH₂—O—CH₃ | 147–148 |
| (11₁) | NH—CH₂—CH(CH₃)₂ | 86–87 |
| (12₁) | NH—C(CH₃)₃ | 128–130 |
| (13₁) | NH—CH₂—CH=CH₂ | 107–108 |
| (14₁) | NH—C₆H₁₁=NH—⟨H⟩ | 132–134 |
| (15₁) | NH—CH₂—⟨ ⟩ | 136–137 |
| (16₁) | N(CH₃)₂ | 165–166 |
| (3₂) | N(C₂H₅)₂ | 102 |
| (17₁) | N(C₄H₉-n)₂ | 81 |
| (18₁) | N(CH₂—CH=CH₂)₂ | 87–88 |
| (19₁) | NH—⟨ ⟩ | 175 |
| (20₁) | —N⟨ O⟩ | 200–201 |

Such compounds may be designated, respectively:

(7) 2,4-dicyano-6-nitro-N-ethyl-aniline
(8) 2,4-dicyano-6-nitro-N-n-propyl-aniline
(9) 2,4-dicyano-6-nitro-N-(β-hydroxy-ethyl)-aniline
(10) 2,4-dicyano-6-nitro-N-(β-methoxy-ethyl)-aniline
(11) 2,4-dicyano-6-nitro-N-iso-butyl-aniline
(12) 2,4-dicyano-6-nitro-N-tert.-butyl-aniline
(13) 2,4-dicyano-6-nitro-N-allyl-aniline
(14) 2,4-dicyano-6-nitro-N-cyclohexyl-aniline
(15) 2,4-dicyano-6-nitro-N-benzyl-aniline
(16) 2,4-dicyano-6-nitro-N,N-dimethyl-aniline
(3) 2,4-dicyano-6-nitro-N,N-diethyl-aniline
(17) 2,4-dicyano-6-nitro-N,N-di-n-butyl-aniline
(18) 2,4-dicyano-6-nitro-N,N-diallyl-aniline
(19) 2,4-dicyano-6-nitro-N-phenyl-aniline
(20) 2,4-dicyano-6-nitro-1-morpholino-benzene.

It will be realized by the artisan that all of the foregoing compounds contemplated by the present invention possess the desired strong selective or total herbicidal properties, and especially the capability of controlling and destroying selectively weeds, as well as a comparatively low toxicity toward warm-blooded creatures, enabling such compounds to be used with correspondingly favorable compatibility with warm-blooded creatures for more effective control and/or elimination of weeds by selective application of such compounds to such weeds and/or their habitat. Nevertheless, the instant compounds possess total herbicidal action when used in large quantities, although selective herbicidal action is obtained when used in smaller quantities. As contemplated herein, the term "weeds" is meant to include not only weeds in the narrow sense, but also in the broad sense, whereby to cover all plants and vegetation considered undesirable for the particular purposes in question.

It will be appreciated that the instant specification and examples are set forth by way of illustration and not limitation, and that various modifications and changes may be made without departing from the spirit and scope of the present invention.

What is claimed is:

1. 2,4-dicyano-6-nitro-benzene compound of the formula:

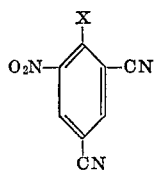

in which X is

R is selected from the group consisting of hydrogen, alkyl of 1–6 carbon atoms, hydroxy-alkyl of 1–4 carbon atoms, alkoxy-alkyl having 1–4 carbon atoms in the alkoxy moiety and 1–4 carbon atoms in the alkyl moiety, alkenyl of 2–6 carbon atoms, cycloalkyl of 5–7 carbon atoms, phenyl-alkyl having 1–2 carbon atoms in the alkyl moiety, and phenyl; and R' is hydrogen or alkyl of 1–6 carbon atoms, and alkenyl of 2–6 carbon atoms.

2. Compound according to claim 1 wherein R is selected from the group consisting of hydrogen, $C_{1-5}$ alkyl, hydroxy-$C_{1-3}$ alkyl, $C_{1-3}$ alkoxy-$C_{1-3}$ alkyl, $C_{2-4}$ alkenyl, $C_{5-6}$ cycloalkyl, benzyl and phenyl, R' is selected from the group consisting of $C_{1-4}$ alkyl and $C_{2-4}$ alkenyl.

3. Compound according to claim 1 wherein R is hydrogen or $C_{1-4}$ alkyl, and R' is $C_{1-4}$ alkyl.

4. Compound according to claim 1 wherein such compound is 2,4-dicyano-6-nitro-N,N-di-n-propyl-aniline of the formula

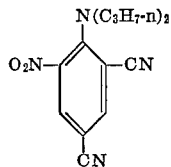

5. Compound according to claim 1 wherein such compound is 2,4-dicyano-6-nitro-N-methyl-aniline of the formula

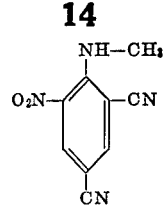

6. Compound according to claim 1 wherein such compound is 2,4-dicyano-6-nitro-aniline of the formula

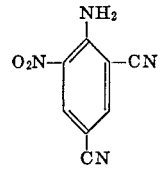

7. Compound according to claim 1 wherein such compound is 2,4-dicyano-6-nitro-N-(β-hydroxy-ethyl)-aniline of the formula

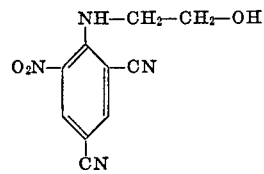

8. Compound according to claim 1 wherein such compound is 2,4-dicyano-6-nitro-N-(β-methoxy-ethyl)-aniline of the formula

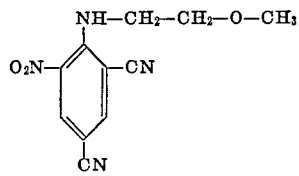

9. Compound according to claim 1 wherein such compound is 2,4-dicyano-6-nitro-N-benzyl-aniline of the formula

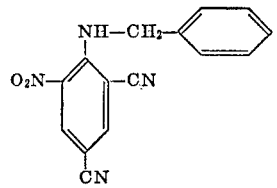

References Cited
UNITED STATES PATENTS 3,287,100   11/1966   Rohr et al. _____ 260—465 X
3,507,903   4/1970    Gottschlich et al. ____ 260—465

LEWIS GOTTS, Primary Examiner

D. H. TORRENCE, Assistant Examiner

U.S. Cl. X.R.

71—94, 95, 105; 260—247, 293, 326.62, 465 F, 465 G